(12) United States Patent
Schroeder et al.

(10) Patent No.: US 9,857,106 B1
(45) Date of Patent: Jan. 2, 2018

(54) HEAT PUMP VALVE ASSEMBLY

(71) Applicant: Haier US Appliance Solutions, Inc., Wilmington, DE (US)

(72) Inventors: Michael Goodman Schroeder, Louisville, KY (US); Michael Alexander Benedict, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/289,244

(22) Filed: Oct. 10, 2016

(51) Int. Cl.
*F25B 21/00* (2006.01)

(52) U.S. Cl.
CPC ........ *F25B 21/00* (2013.01); *F25B 2321/002* (2013.01)

(58) Field of Classification Search
CPC ..... F25B 21/04; F25B 21/00; F25B 2321/002
See application file for complete search history.

(56) References Cited

U.S. PATENT DOCUMENTS

| | | |
|---|---|---|
| 668,560 A | 2/1901 | Fulner et al. |
| 2,765,633 A | 10/1956 | Muffly |
| 4,037,427 A | 7/1977 | Kramer |
| 4,107,935 A | 8/1978 | Steyert, Jr. |
| 4,259,843 A | 4/1981 | Kausch |
| 4,507,927 A | 4/1985 | Barclay |
| 4,549,155 A | 10/1985 | Halbach |
| 4,625,519 A | 12/1986 | Hakuraku et al. |
| 4,642,994 A | 2/1987 | Barclay et al. |
| 5,091,361 A | 2/1992 | Hed |
| 5,156,003 A | 10/1992 | Yoshiro et al. |
| 5,249,424 A | 10/1993 | DeGregoria et al. |
| 5,465,781 A | 11/1995 | DeGregoria |
| 5,934,078 A | 8/1999 | Lawton, Jr. et al. |
| 6,332,323 B1 | 12/2001 | Reid et al. |

(Continued)

FOREIGN PATENT DOCUMENTS

| | | |
|---|---|---|
| CA | 2893874 A1 | 6/2014 |
| CA | 2919117 A1 | 1/2015 |

(Continued)

OTHER PUBLICATIONS

International Search Report and Written Opinion issued in connection with PCT Application No. PCT/US2014/042485 dated Oct. 31, 2014.

(Continued)

*Primary Examiner* — Cassey D Bauer
(74) *Attorney, Agent, or Firm* — Dority & Manning, P.A.

(57) ABSTRACT

A heat pump includes a regenerator housing that is movable along a lateral direction relative to a magnet. A valve assembly is provided for regulating a flow of the working fluid from a pump through the regenerator housing. The valve assembly includes a pair of inlet conduits that extend along the lateral direction from the regenerator housing. A pair of outlet conduits also extends along the lateral direction from the regenerator housing. A valve body assembly defines a plurality of shafts that each receives a respective conduit of the pair of inlet conduits and the pair of outlet conduits. The conduits of the pair of inlet conduits and the pair of outlet conduits are slidable within the shafts of the plurality of shafts.

19 Claims, 8 Drawing Sheets

(56) References Cited

U.S. PATENT DOCUMENTS

| | | |
|---|---|---|
| 6,446,441 B1 | 9/2002 | Dean |
| 6,588,215 B1 | 7/2003 | Ghoshal |
| 6,668,560 B2 | 12/2003 | Zimm et al. |
| 6,935,121 B2 | 8/2005 | Fang et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin |
| 7,897,898 B2 | 3/2011 | Muller et al. |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,769,966 B2 | 7/2014 | Heitzler et al. |
| 8,869,541 B2 | 10/2014 | Heitzler et al. |
| 8,935,927 B2 | 1/2015 | Kobayashi et al. |
| 9,245,673 B2 | 1/2016 | Carroll et al. |
| 9,377,221 B2 | 6/2016 | Benedict |
| 2003/0051774 A1 | 3/2003 | Saito |
| 2004/0093877 A1* | 5/2004 | Wada .................. F25B 21/00 62/114 |
| 2004/0250550 A1 | 12/2004 | Bruck |
| 2006/0231163 A1 | 10/2006 | Hirosawa et al. |
| 2008/0236171 A1 | 10/2008 | Saito et al. |
| 2009/0091411 A1 | 4/2009 | Zhang et al. |
| 2009/0158749 A1 | 6/2009 | Sandeman |
| 2010/0000228 A1 | 1/2010 | Wiest et al. |
| 2010/0071383 A1 | 3/2010 | Zhang et al. |
| 2010/0236258 A1 | 9/2010 | Heitzler et al. |
| 2011/0042608 A1 | 2/2011 | Reesink |
| 2011/0048690 A1 | 3/2011 | Reppel et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0239662 A1 | 10/2011 | Bahl et al. |
| 2011/0308258 A1 | 12/2011 | Smith et al. |
| 2012/0033002 A1 | 2/2012 | Sealer et al. |
| 2012/0036868 A1 | 2/2012 | Heitzler et al. |
| 2012/0045698 A1 | 2/2012 | Shima |
| 2012/0079834 A1 | 4/2012 | Dinesen |
| 2012/0222427 A1 | 9/2012 | Hassen |
| 2012/0222428 A1 | 9/2012 | Celik et al. |
| 2012/0267090 A1 | 10/2012 | Kruglick |
| 2012/0272666 A1 | 11/2012 | Watanabe |
| 2012/0285179 A1 | 11/2012 | Morimoto |
| 2013/0019610 A1 | 1/2013 | Zimm et al. |
| 2013/0104568 A1 | 5/2013 | Kuo et al. |
| 2013/0187077 A1 | 7/2013 | Katter |
| 2013/0192269 A1 | 8/2013 | Wang |
| 2013/0232993 A1 | 9/2013 | Saito et al. |
| 2013/0269367 A1 | 10/2013 | Meillan |
| 2013/0319012 A1 | 12/2013 | Kuo et al. |
| 2014/0020881 A1 | 1/2014 | Reppel et al. |
| 2014/0075958 A1 | 3/2014 | Takahashi et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0290273 A1 | 10/2014 | Benedict et al. |
| 2014/0291570 A1 | 10/2014 | Klausner et al. |
| 2014/0305139 A1 | 10/2014 | Takahashi et al. |
| 2014/0325996 A1 | 11/2014 | Muller |
| 2015/0027133 A1 | 1/2015 | Benedict |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0168030 A1 | 6/2015 | Leonard et al. |
| 2015/0260433 A1 | 9/2015 | Choi et al. |
| 2015/0362225 A1 | 12/2015 | Schwartz |
| 2016/0355898 A1 | 12/2016 | Vieyra Villegas et al. |
| 2017/0071234 A1 | 3/2017 | Garg |

FOREIGN PATENT DOCUMENTS

| | | |
|---|---|---|
| CN | 101979937 A | 2/2011 |
| CN | 202432596 U | 9/2012 |
| CN | 103090583 A | 5/2013 |
| CN | 103712401 A | 4/2014 |
| CN | 102077303 B | 4/2015 |
| DE | 102013223959 A1 | 5/2015 |
| EP | 2071255 A1 | 6/2009 |
| EP | 2108904 A1 | 10/2009 |
| FR | 2935468 A1 | 3/2010 |
| JP | 59232922 | 12/1984 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| KR | 101100301 B1 | 12/2011 |
| KR | 1238234 B1 | 3/2013 |
| WO | WO0212800 A1 | 2/2002 |
| WO | WO03016794 A1 | 2/2003 |
| WO | WO 2004/068512 | 8/2004 |
| WO | WO 2007/036729 A1 | 4/2007 |
| WO | WO 2009/024412 | 2/2009 |
| WO | WO2011034594 A1 | 3/2011 |
| WO | WO2014173787 A1 | 10/2014 |

OTHER PUBLICATIONS

International Search Report and Written Opinion issued in connection with PCT Application No. PCT/US2014/017431 dated May 16, 2014.

International search report issued in connection with PCT/US2013/070518, dated Jan. 30, 2014.

Tetsuji Okamura, Performance of a room-temperature rotary magnet refrigerator, dated Nov. 28, 2005, Elsevier.

Journal of Alloys and Compounds, copyright 2008 Elsevier B.. V.. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materiala 63 (2010).

PCT International Search Report and Written Opinion issued in connection with PCT Application No. PCT/US2013/070023 dated Feb. 27, 2014.

Barbara Pulko, Epoxy-bonded La—Fe—Co—Si magentocaloric plates, Journal of Magnetism and Magnetic Materials, 375, (2015) 65-73.

* cited by examiner

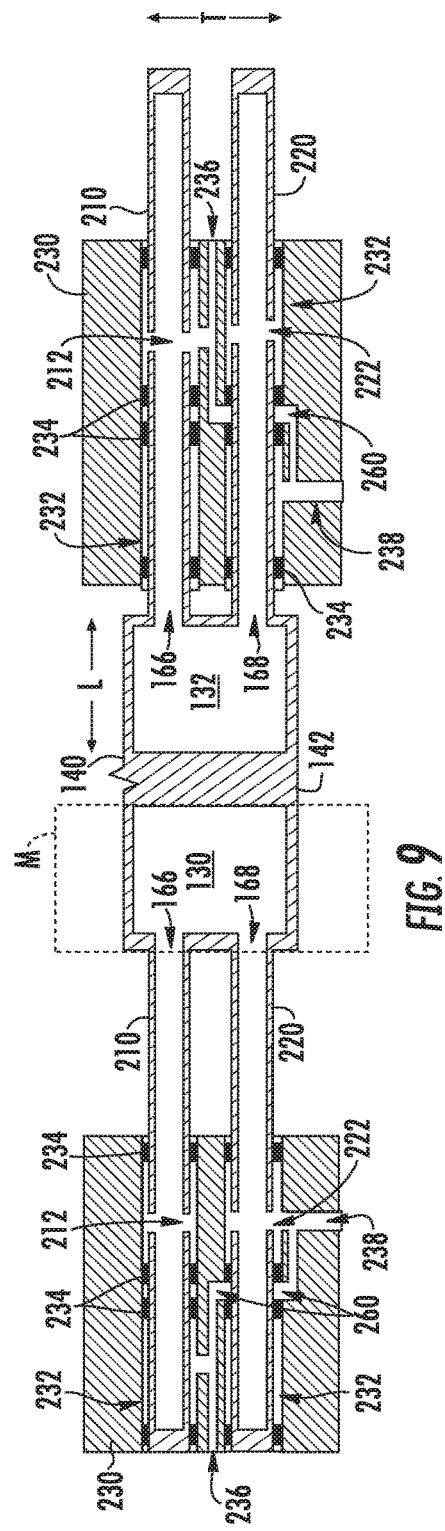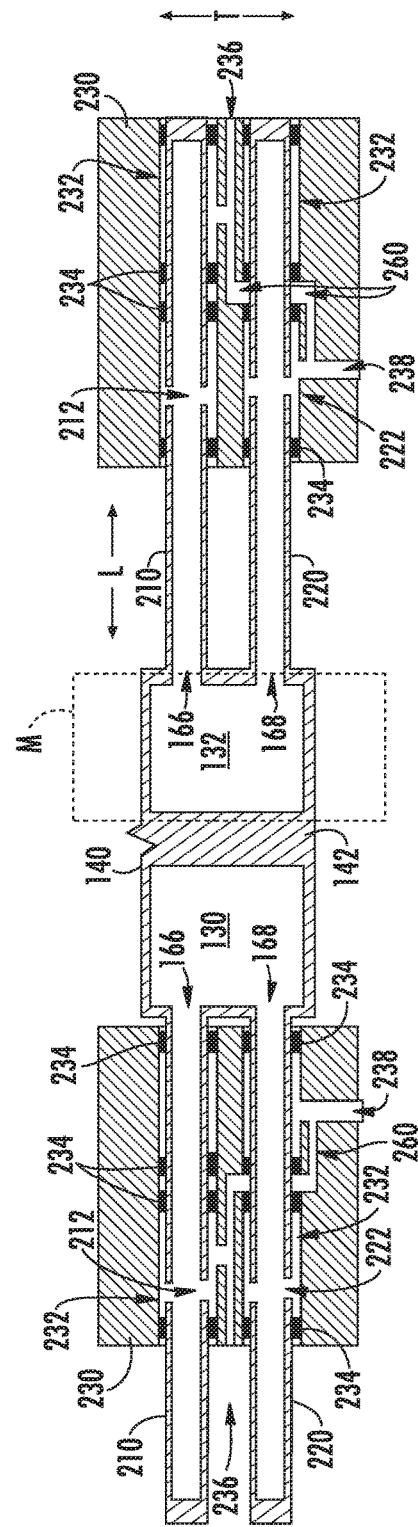

HEAT PUMP VALVE ASSEMBLY

FIELD OF THE INVENTION

The present subject matter relates generally to heat pumps, such as magneto-caloric heat pumps, and valve assemblies for heat pumps.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

A heat pump includes a regenerator housing that is movable along a lateral direction relative to a magnet. A valve assembly is provided for regulating a flow of the working fluid from a pump through the regenerator housing. The valve assembly includes a pair of inlet conduits that extend along the lateral direction from the regenerator housing. A pair of outlet conduits also extends along the lateral direction from the regenerator housing. A valve body assembly defines a plurality of shafts that each receives a respective conduit of the pair of inlet conduits and the pair of outlet conduits. The conduits of the pair of inlet conduits and the pair of outlet conduits are slidable within the shafts of the plurality of shafts. Additional aspects and advantages of the invention will be set forth in part in the following description, or may be apparent from the description, or may be learned through practice of the invention.

In a first exemplary embodiment, a heat pump is provided. The heat pump includes a magnet that generates a magnetic field. A regenerator housing includes a body and a stage. The body defines a chamber. The stage includes a magneto-caloric material disposed within the chamber. The regenerator housing is movable along a lateral direction between a first position and a second position relative to the magnet. The stage is positioned within the magnetic field of the magnet when the regenerator housing is in the first position. The stage is positioned remote from the magnetic field of the magnet when the regenerator housing is in the second position. A pump is operable to flow working fluid through the chamber of the regenerator housing. A valve assembly is provided for regulating a flow of the working fluid from the pump through the chamber of the regenerator housing. The valve assembly includes a pair of inlet conduits that extend along the lateral direction from the regenerator housing. The inlet conduits of the pair of inlet conduits are spaced apart from each other on the regenerator housing along a transverse direction that is perpendicular to the lateral direction. A pair of outlet conduits also extends along the lateral direction from the regenerator housing. The outlet conduits of the pair of outlet conduits are spaced apart from each other on the regenerator housing along the transverse direction. A valve body assembly defines a plurality of shafts. Each shaft of the plurality of shafts receives a respective conduit of the pair of inlet conduits and the pair of outlet conduits. The conduits of the pair of inlet conduits and the pair of outlet conduits are slidable within the shafts of the plurality of shafts when the regenerator housing moves between the first and second positions.

In a second exemplary embodiment, a heat pump is provided. The heat pump includes a magnet that generates a magnetic field. A regenerator housing includes a body and a pair of stages. The body defines a pair of chambers spaced apart from each other along a lateral direction within the body. Each stage of the pair of stages includes a magneto-caloric material disposed within a respective chamber of the pair of chambers. The regenerator housing is movable along the lateral direction between a first position and a second position relative to the magnet. A first stage of the pair of stages is positioned within the magnetic field of the magnet and a second stage of the pair of stages is positioned remote from the magnetic field of the magnet when the regenerator housing is in the first position. The first stage is positioned remote from the magnetic field of the magnet and the second stage is positioned within the magnetic field of the magnet when the regenerator housing is in the second position. A pump is operable to flow working fluid. A valve assembly is provided for regulating a flow of the working fluid from the pump through the pair of stages. The valve assembly includes four valve bodies. Each valve body of the four valve bodies defines a pair of shafts. Four inlet conduits extend along the lateral direction from the regenerator housing. A respective inlet conduit of the four inlet conduits is received and slidable within a first shaft of each valve body of the four valve bodies. Four outlet conduits also extend along the lateral direction from the regenerator housing. A respective outlet conduit of the four outlet conduits is received and slidable within a second shaft of each valve body of the four valve bodies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 9 and 10 provide schematic illustration of certain components of the heat pump system of FIG. 2, including a portion of the regenerator housing shown in various positions.

DETAILED DESCRIPTION

Figure 1:
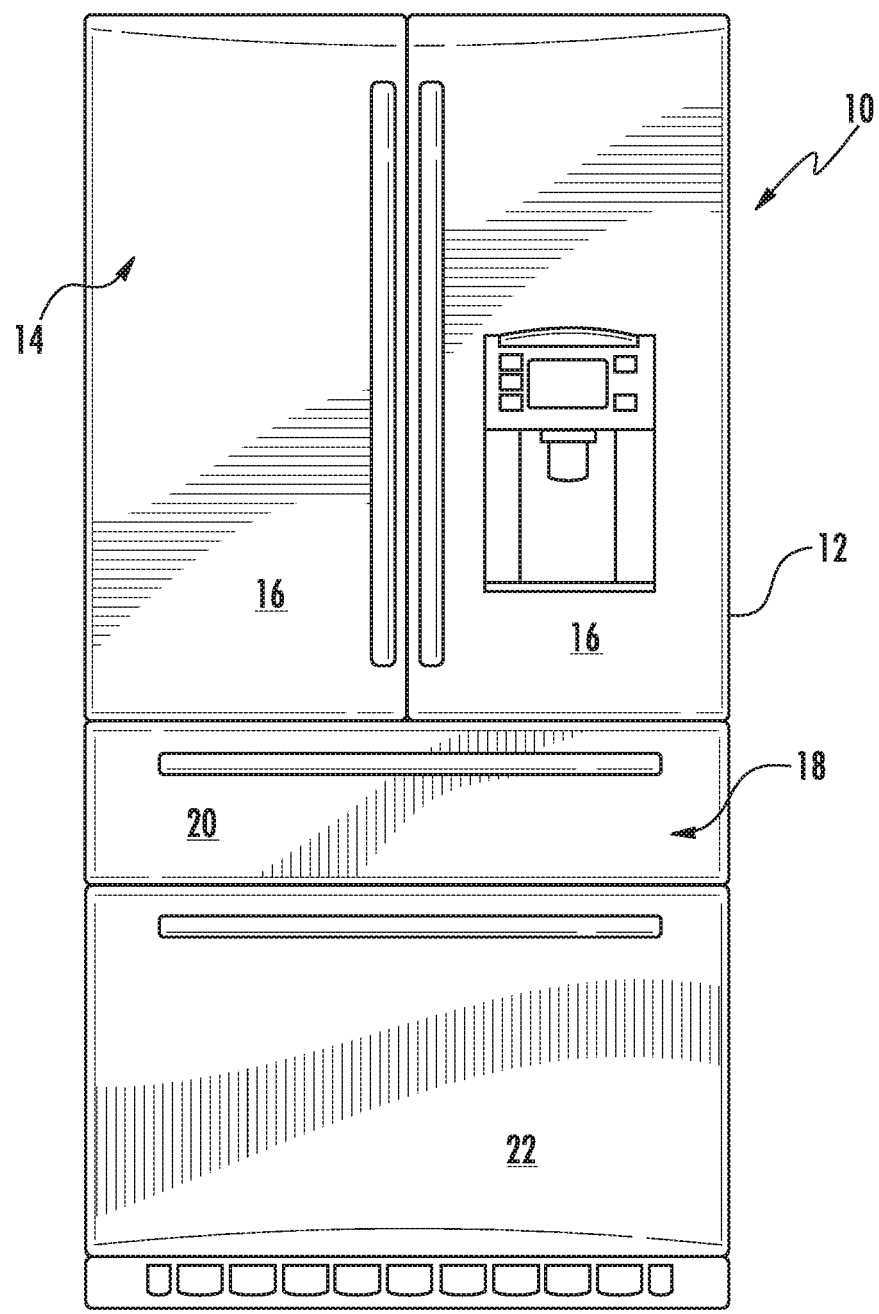
FIG. 1 is a refrigerator appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
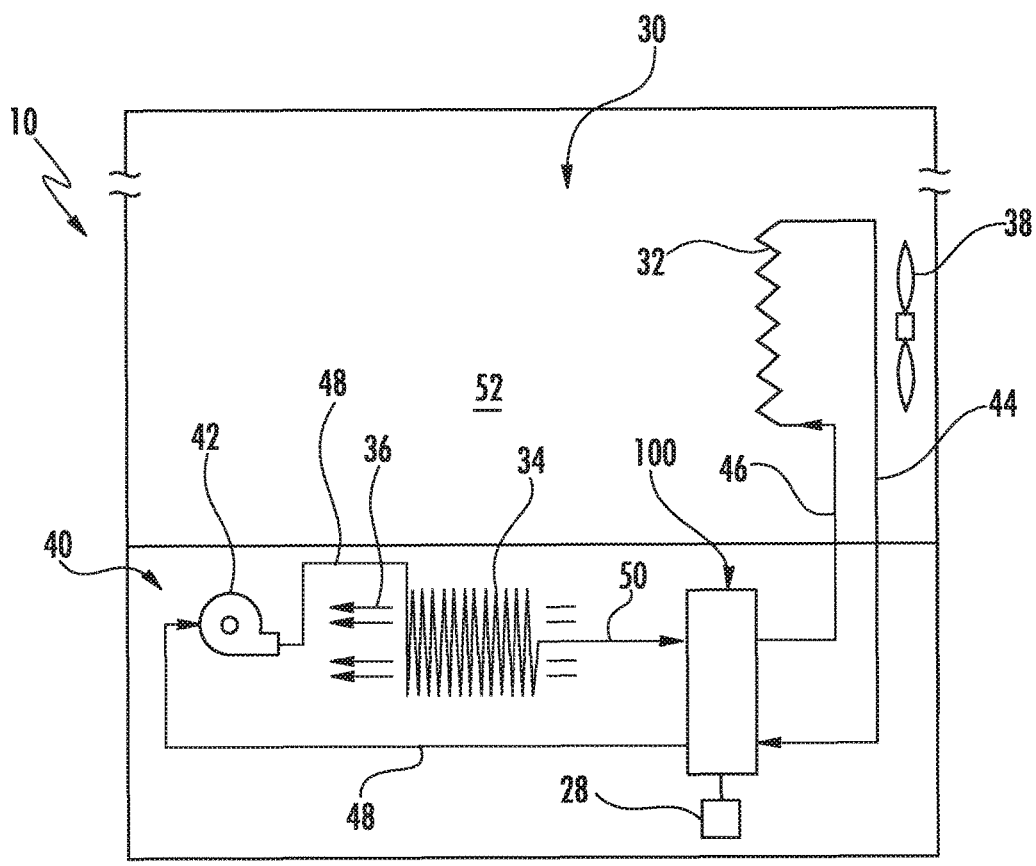
FIG. 2 is a schematic illustration of certain components of a heat pump system positioned in the exemplary refrigerator appliance of FIG. 1.

FIG. 2 is a schematic view of various components of refrigerator appliance 10, including a refrigeration compartment 30 and a machinery compartment 40. In particular, the refrigeration compartment 30 and machinery compartment 40 include a heat pump system 52 having a first or cold side heat exchanger 32 positioned in refrigeration compartment 30 for the removal of heat therefrom. A heat transfer fluid such as e.g., an aqueous solution, flowing within first heat exchanger 32 receives heat from refrigeration compartment 30 thereby cooling contents of refrigeration compartment 30. A fan 38 may be used to provide for a flow of air across first heat exchanger 32 to improve the rate of heat transfer from refrigeration compartment 30.

The heat transfer fluid flows out of first heat exchanger 32 by line 44 to heat pump 100. As will be further described herein, the heat transfer fluid receives additional heat from magneto-caloric material (MCM) in heat pump 100 and carries this heat by line 48 to pump 42 and then to second or hot side heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100, as will be further described.

From second heat exchanger 34, the heat transfer fluid returns by line 50 to heat pump 100 where, as will be further described below, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of heat pump system 52 but other heat transfer fluid recirculation loops with different lines and connections may also be employed. For example, pump 42 can also be positioned at other locations or on other lines in system 52. Still other configurations of heat pump system 52 may be used as well.

FIGS. 3 through 10 illustrate an exemplary heat pump 100 and components thereof, and the use of such heat pumps 100 with heat pump system 52, in accordance with exemplary embodiments of the present disclosure. Components of heat pump 100 may be oriented relative to a coordinate system for heat pump 100, which may include a vertical direction V, a transverse direction T and a lateral direction L, all of which may be mutually perpendicular and orthogonal to one another.

Figure 4:
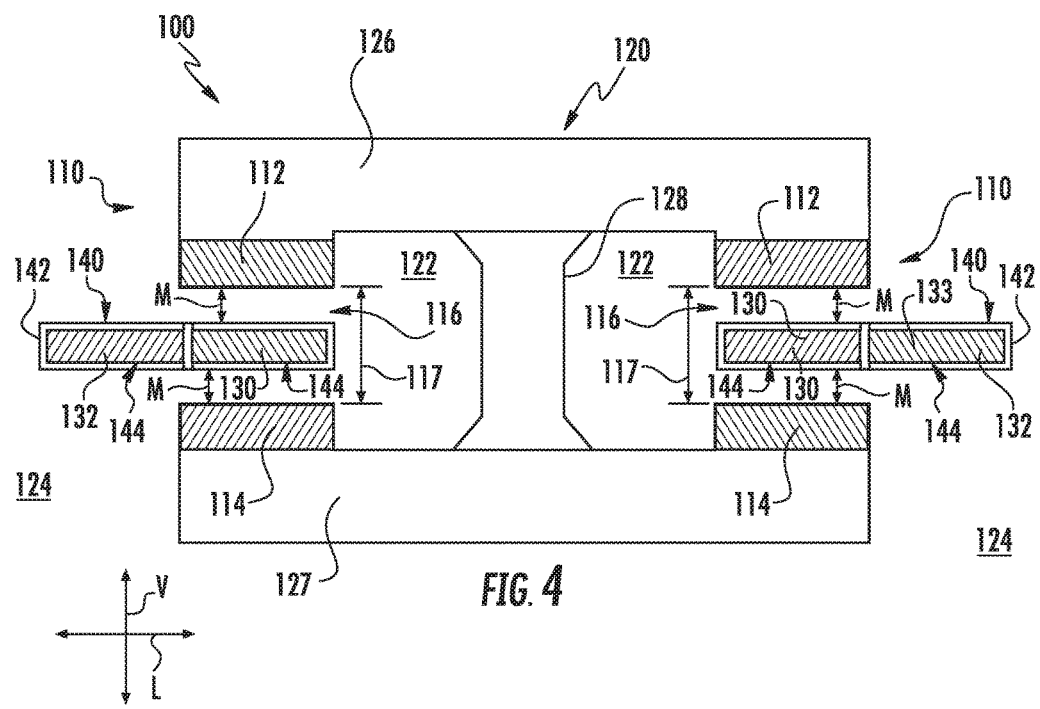
FIG. 4 is a front view of an exemplary caloric heat pump of the heat pump system of FIG. 2, with first stages of MCM within magnetic fields and second stages of MCM out of magnetic fields.
Figure 5:
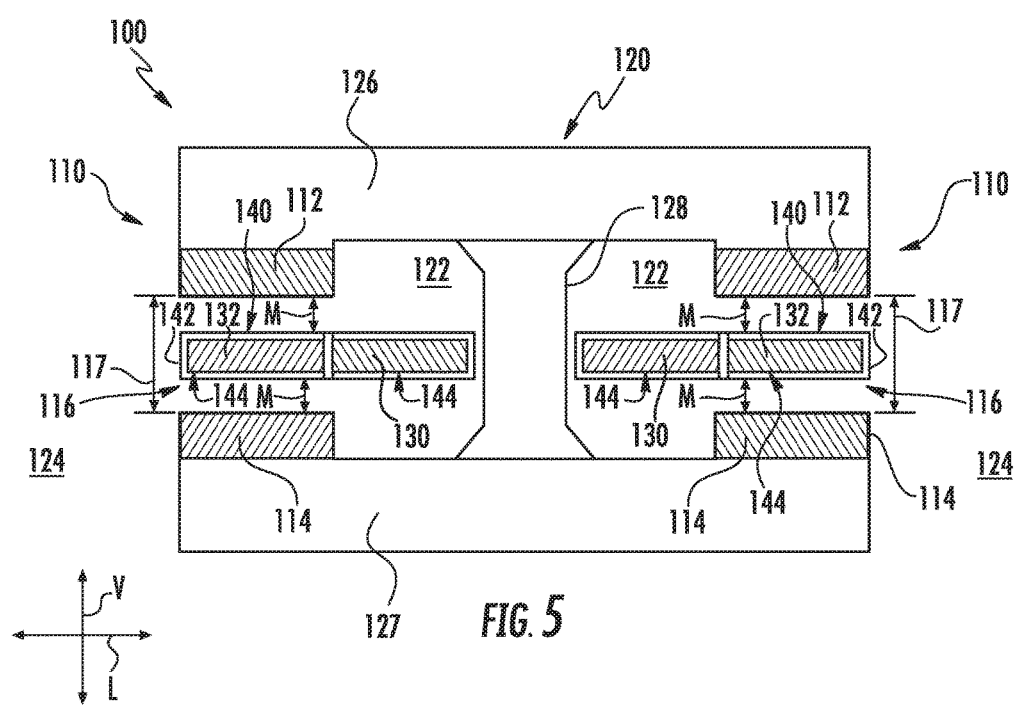
FIG. 5 is a front view of the exemplary caloric heat pump of the heat pump system of FIG. 2, with first stages of MCM out of magnetic fields and second stages of MCM within magnetic fields.

As shown in FIGS. 4 and 5, heat pump 100 includes one or more magnet assemblies 110, each of which creates a magnetic field M. For example, a magnetic field M may be generated by a single magnet, or by multiple magnets. In exemplary embodiments as illustrated, a first magnet 112 and a second magnet 114 may be provided, and the magnetic field M may be generated between magnets 112, 114. Magnets 112, 114 may, for example, have opposite magnetic polarities such that they either attract or repel each other. Magnets 112, 114 of magnet assembly 110 may also be spaced apart from each other, such as along the vertical direction V. A gap 116 may thus be defined between first magnet 112 and second magnet 114, such as along the vertical direction V.

Heat pump 100 may further include a support frame 120 which supports magnet assembl(ies) 110. Magnet assembly 110 may be connected to support frame 120. For example, each magnet 112, 114 of magnet assembly 110 may be connected to support frame 120. Such connection in exemplary embodiments is a fixed connection via a suitable adhesive, mechanical fasteners and/or a suitable connecting technique, such as welding, brazing, etc. Support assembly 120 may, for example, support magnets 112, 114 in position such that gap 114 is defined between magnets 112, 114.

As illustrated, support frame 120 is an open-style frame, such that interior portions of support frame 120 are accessible from exterior to support frame 120 (e.g. in the lateral and transverse directions L, T) and components of heat pump 100 can be moved from interior to support frame 120 to exterior to support frame 120 and vice-versa. For example, support frame 120 may define one or more interior spaces 122. Multiple interior spaces 122, as shown, may be partitioned from each other by frame members or other components of the support frame 120. An interior space 122 may be contiguous with associated magnets 112, 114 (i.e. magnet assembly 110) and gap 116, such as along the lateral direction L. Support frame 120 may additionally define one or more exterior spaces 124, each of which includes the exterior environment proximate support frame 120. Specifically, an exterior space 124 may be contiguous with associated magnets 112, 114 (i.e. magnet assembly 110) and gap 116, such as along the lateral direction L. An associated interior space 122 and exterior space 124 may be disposed on opposing sides of associated magnets 112, 114 (i.e. magnet assembly 110) and gap 116, such as along the lateral direction L. Thus, magnet assembly 110 and gap 116 may be positioned between an associated interior space 122 and exterior space 124, e.g., along the lateral direction L.

As illustrated in FIGS. 4 and 5, support frame 120, frame members and other components thereof may include and form one or more C-shaped portions. A C-shaped portion may, for example, define an interior space 122 and associated gap 116, and may further define an associated exterior space 124 as shown. In exemplary embodiments as illustrated, support frame 120 may support two magnet assemblies 110, and may define an interior space 122, gap 116, and exterior space 124 associated with each of two magnet assemblies 110. Alternatively, however, a support frame 120 may support only a single magnet assembly 110 or three or more magnet assemblies 110.

Various frame members may be utilized to form support frame 120. For example, in some exemplary embodiments, an upper frame member 126 and a lower frame member 127 may be provided. Lower frame member 127 may be spaced apart from upper frame member 126 along the vertical axis V. First magnet(s) 112 may be connected to upper frame member 126, and second magnet(s) 114 may be connected to lower frame member 127. In exemplary embodiments, upper frame member 126 and lower frame member 127 may be formed from materials which have relatively high magnetic permeability, such as iron.

In some exemplary embodiments, as illustrated in FIGS. 4 and 5, a support frame 120 may further include an intermediate frame member 128. Intermediate frame member 128 may be disposed and extend between and connect upper frame member 126 and lower frame member 127, and may in some exemplary embodiments be integrally formed with upper and lower frame members 126, 127. As shown, multiple interior spaces 122 may be partitioned from each other by intermediate frame member 128. In some exemplary embodiments, intermediate frame member 128 may be formed from materials which have relatively high magnetic permeability, such as iron. In other exemplary embodiments, intermediate frame member 128 may be formed from materials which have relatively lower magnetic permeability than those of upper and lower frame members 126, 127. Accordingly, such materials, termed magnetically shielding materials herein, may facilitate direction of magnetic flux paths only through upper and lower frame members 126, 127 and magnet assemblies 110, advantageously reducing losses in magnetic strength, etc.

Referring again to FIGS. 3 through 10, heat pump 100 may further include a plurality of stages, each of which includes a magneto-caloric material (MCM). In exemplary embodiments, such MCM stages may be provided in pairs, each of which may for example include a first stage 130 and a second stage 132. Each stage 130, 132 may include one or more different types of MCM. Further, the MCM(s) provided in each stage 130, 132 may be the same or may be different.

As provided in heat pump 100, each stage 130, 132 may extend, such as along the transverse direction T, between a first end portion 134 and a second end portion 136. As discussed herein, working fluid (also referred to herein as heat transfer fluid or fluid refrigerant) may flow into each stage 130, 132 and from each stage 130, 132 through first end portion 134 and second end portion 136. Accordingly, working fluid flowing through a stage 130, 132 during operation of heat pump 100 flows generally along the transverse direction T between first and second end portions 134, 136 of stages 130, 132.

Stages 130, 132, such as each pair of stages 130, 132, may be disposed within regenerator housings 140. Regenerator housing 140 along with stages 130, 132 and optional insulative materials may collectively be referred to as a regenerator assembly. As shown in FIGS. 4 and 5, regenerator housing 140 includes a body 142 which defines a plurality of chambers 144, each of which extends along the transverse direction T between opposing ends of chamber 144. Chambers 144 of a regenerator housing 140 may thus be arranged in a linear array along the lateral direction L, as shown. Each stage 130, 132, such as of a pair of stages 130, 132, may be disposed within one of chambers 144 of a regenerator housing 140. Accordingly, these stages 130, 132 may be disposed in a linear array along the lateral direction L. As illustrated, in exemplary embodiments, each regenerator housing 140 may include a pair of stages 130, 132. Alternatively, three, four or more stages 130, 132 may be provided in a regenerator housing 140.

The regenerator housing(s) 140 (and associated stages 130, 132) and magnet assembly(s) 110 may be movable relative to each other, such as along the lateral direction L. In exemplary embodiments as shown, for example, each regenerator housing 140 (and associated stages 130, 132) is movable relative to an associated magnet assembly 110, such as along the lateral direction L. Alternatively, however, each magnet assembly 110 may be movable relative to the associated regenerator housing 140 (and associated stages 130, 132), such as along the lateral direction L.

Such relative movement between regenerator housing 140 and an associated magnet assembly 110 causes movement of each stage 130, 132 into the magnetic field M and out of the magnetic field M. As discussed herein, movement of a stage 130, 132 into the magnetic field M may cause the magnetic moments of the material to orient and the MCM to heat (or alternatively cool) as part of the magneto-caloric effect. When one of stages 130, 132 is out of the magnetic field M, the MCM may thus cool (or alternatively heat) due to disorder of the magnetic moments of the material.

For example, a regenerator housing 140 (or an associated magnet assembly 110) may be movable along the lateral direction L between a first position and a second position. In the first position (as illustrated for example in FIG. 4), regenerator housing 140 may be positioned such that first stage 130 disposed within regenerator housing 140 is within the magnetic field M and second stage 132 disposed within regenerator housing 140 is out of the magnetic field M. Notably, being out of the magnetic field M means that second stage 132 is generally or substantially uninfluenced by the magnets and resulting magnetic field M. Accordingly, the MCM of the stage as a whole may not be actively heating (or cooling) as it would if within the magnetic field M (and instead may be actively or passively cooling (or heating) due to such removal of the magnetic field M). In the second position (as illustrated for example in FIG. 5), regenerator housing 140 may be positioned such that first stage 130 disposed within regenerator housing 140 is out of the magnetic field M and second stage 132 disposed within regenerator housing 140 is within the magnetic field M.

Regenerator housing 140 (or an associated magnet assembly 110) is movable along the lateral direction L between the first position and the second position. Such movement along the lateral direction L from the first position to the second position may be referred to herein as a first transition, while movement along the lateral direction L from the second position to the first position may be referred to herein as a second transition.

Figure 6:
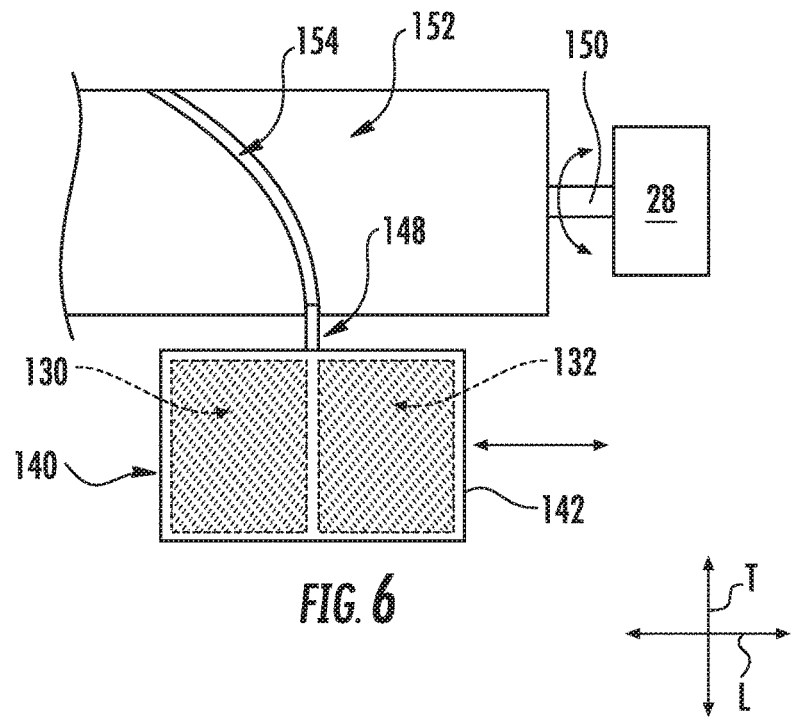
FIG. 6 is a top view of certain components of the exemplary caloric heat pump of FIG. 5.
Figure 7:
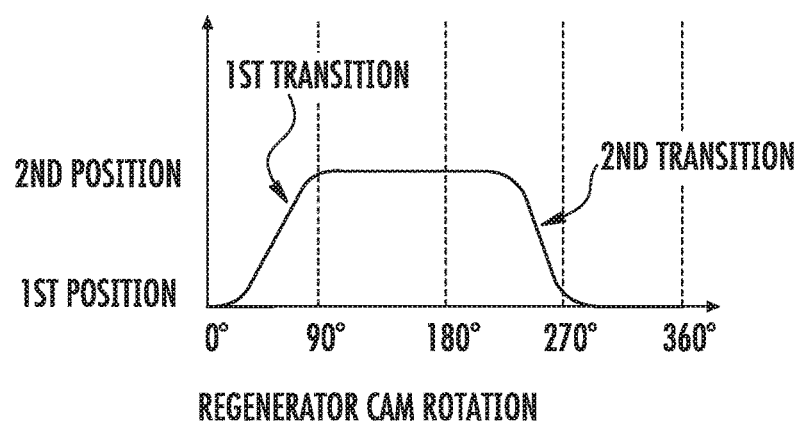
FIG. 7 is a chart illustrating operation of pumps to actively flow working fluid in accordance with an exemplary embodiment of the present disclosure.

Referring to FIGS. 6 and 7, movement of a regenerator housing 140 (or an associated magnet assembly 110) may be caused by operation of motor 26. Motor 26 may be in mechanical communication with regenerator housing 140 (or magnet assembly 110) and configured for moving regenerator housing 140 (or magnet assembly 110) along the lateral direction L (i.e. between the first position and second position). For example, a shaft 150 of motor 28 may be connected to a cam. The cam may be connected to the regenerator housing 140 (or associated magnet assembly 110), such that relative movement of the regenerator housing 140 and associated magnet assembly 110 is caused by and due to rotation of the cam. The cam may, as shown, be rotational about the lateral direction L.

For example, in some exemplary embodiments as illustrated in FIGS. 6 and 7, the cam may be a cam cylinder 152. Cam cylinder 152 may be rotational about an axis that is parallel to the lateral direction L. A cam groove 154 may be defined in cam cylinder 152, and a follower tab 148 of regenerator housing 120 may extend into cam groove 154. Rotation of motor 28 may cause rotation of cam cylinder 152. Cam groove 154 may be defined in a particularly desired cam profile such that, when cam cylinder 152 rotates, tab 148 moves along the lateral direction L between the first position and second position due to the pattern of cam groove 154 and in the cam profile, in turn causing such movement of regenerator housing 120.

FIG. 7 illustrates one exemplary embodiment of a cam profile which includes a first position, first transition, second position, and second transition. Notably, in exemplary embodiments the period during which a regenerator housing 140 (or an associated magnet assembly 110) is dwelling in the first position and/or second position may be longer than the period during which the regenerator housing 140 (or an associated magnet assembly 110) is moving in the first transition and/or second transition. Accordingly, the cam profile defined by the cam defines the first position, the second position, the first transition, and the second transition. In exemplary embodiments, the cam profile causes the one of regenerator housing 140 or magnet assembly 110 to dwell in the first position and the second position for periods of time longer than time periods in the first transition and second transition.

Referring again to FIG. 2, in some exemplary embodiments, lines 44, 46, 48, 50 may facilitate the flow of working fluid between heat exchangers 32, 34 and heat pump 100. Referring now to FIG. 4, in exemplary embodiments, lines 44, 46, 48, 50 may facilitate the flow of working fluid between heat exchangers 32, 34 and stages 130, 132 of heat pump 100. Working fluid may flow to and from each stage 130, 132 through various apertures defined in each stage. The apertures generally define the locations of working fluid flow to or from each stage. In some exemplary embodiments as illustrated in FIG. 4, multiple apertures (e.g., two apertures) may be defined in first end 134 and second end 136 of each stage 130, 132. For example, each stage 130, 132 may define a cold side inlet 162, a cold side outlet 164, a hot side inlet 166 and a hot side outlet 168. Cold side inlet 162 and cold side outlet 164 may be defined in each stage 130, 132 at first end 134 of stage 130, 132, and hot side inlet 166 and hot side outlet 168 may be defined in each stage 130, 132 at second end 136 of stage 130, 132. The inlets and outlets may provide fluid communication for the working fluid to flow into and out of each stage 130, 132, and from or to heat exchangers 32, 34.

Heat pump 100 also includes features for regulating the flow of working fluid through regenerator housing 140 via the apertures. In particular, heat pump 100 includes a valve assembly 200 that assists with regulating the flow of working fluid through regenerator housing 140. Valve assembly 200 may include a plurality of inlet conduits 210 and a plurality of outlet conduits 220. Inlet and outlet conduits 210, 220 are mounted or coupled to regenerator housing 140 at the apertures. For example, a respective one of inlet conduits 210 may be coupled to regenerator housing 140 at each cold side inlet 162 and hot side inlet 166 of stages 130, 132. Similarly, a respective one of outlet conduits 220 may be coupled to regenerator housing 140 at each cold side outlet 164 and hot side outlet 168 of stages 130, 132. Working fluid may flow into stages 130, 132 via cold side inlet 162, hot side inlet 166 and inlet conduits 210 while working fluid may flow out of stages 130, 132 via cold side outlet 164, hot side outlet 168 and outlet conduits 220.

Inlet and outlet conduits 210, 220 extend from regenerator housing 140, e.g., along the lateral direction L. Inlet and outlet conduits 210, 220 may be disposed or oriented such that inlet conduits 210 and/or outlet conduits 220 are parallel with one another. In addition, inlet conduits 210 may be spaced apart from each other, e.g., along the lateral direction L and/or the transverse direction T, on regenerator housing 140. Similarly, outlet conduits 220 may also be spaced apart from each other, e.g., along the lateral direction L and/or the transverse direction T, on regenerator housing 140.

Inlet and outlet conduits 210, 220 may be mounted or coupled to regenerator housing 140 using any suitable method or mechanism. For example, inlet and outlet conduits 210, 220 may be separate components, such as metal or plastic pipes, that are fastened, threaded, adhered, welded, etc. to regenerator housing 140. As another example, inlet and outlet conduits 210, 220 may be integral with regenerator housing 140, e.g., such that inlet and outlet conduits 210, 220 have a one-piece seamless construction with regenerator housing 140. Thus, e.g., inlet and outlet conduits 210, 220 may be molded or additively formed with regenerator housing 140.

Valve assembly 200 also includes at least a valve body assembly 230. In the exemplary embodiment shown in FIG. 3, heat pump 100 includes four separate valve bodies 230. However, it will be understood that the four separate valve bodies 230 shown in FIG. 3 may be combined together into a single valve body, two valve bodies, etc. in alternative exemplary embodiments. Thus, the terms "valve body" and "valve bodies" are used interchangeably herein. Valve bodies 230 define shafts 232 that receive inlet and outlet conduits 210, 220. In particular, each of inlet and outlet conduits 210, 220 is received and slidable within a respective shaft of shafts 232. Thus, e.g., inlet and outlet conduits 210, 220 may slide within shafts 232 of valve bodies 230 such that valve assembly 100 supports and guides motion of regenerator housing 140, e.g., along the lateral direction L, during operation of heat pump 100. For example, valve assembly 100 may support and/or guide motion of regenerator housing 140 such that regenerator housing 140 is moveable along the lateral direction L while motion of regenerator housing 140 perpendicular to the lateral direction L is constrained by valve assembly 100. Valve assembly 200 may be symmetrical, e.g., in a plane defined by the lateral direction L and transverse direction T, to provide such operation.

Figure 3:
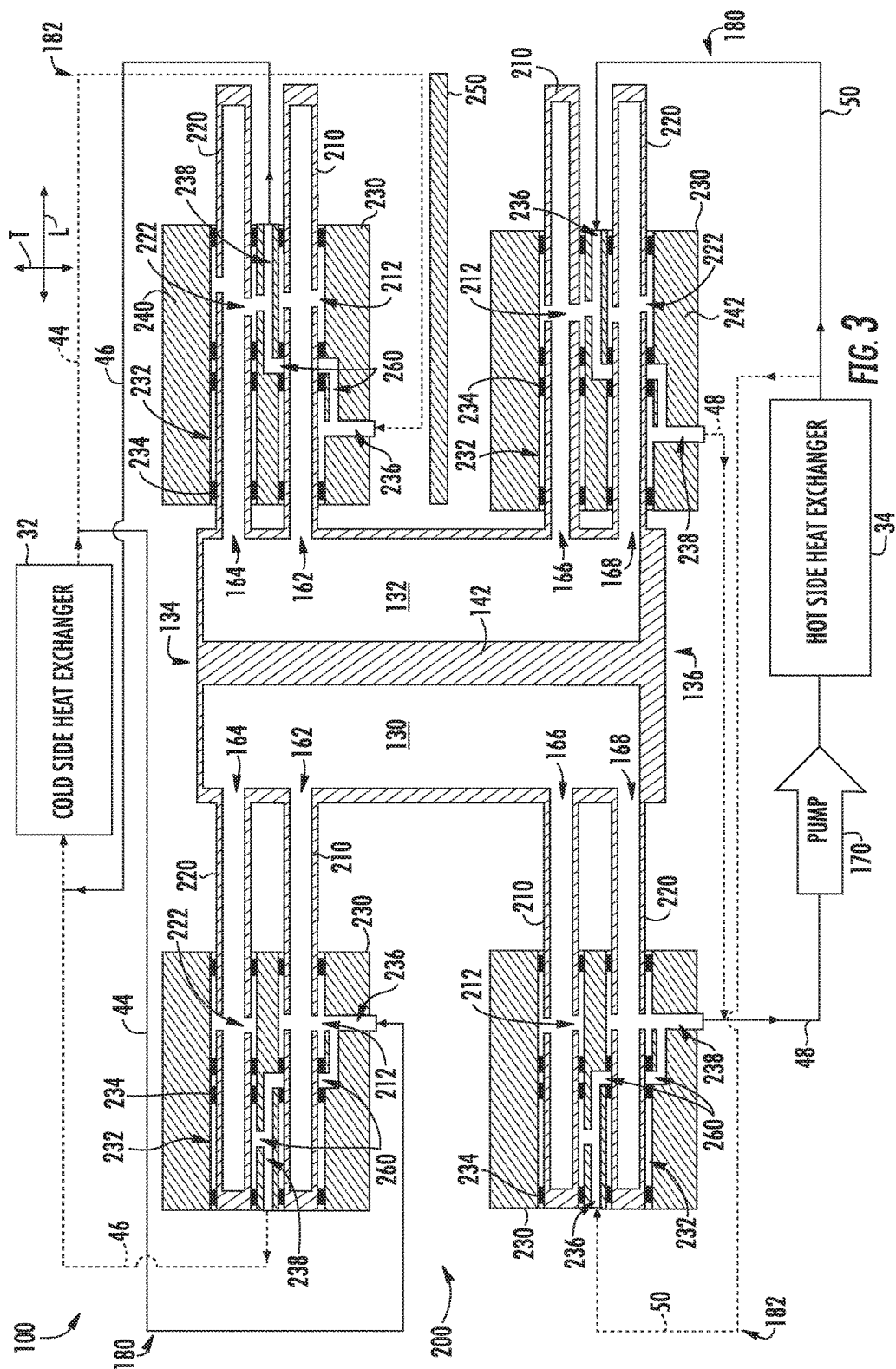
FIG. 3 is a schematic illustration of certain components of the heat pump system of FIG. 2, with a regenerator housing shown in a first position, in accordance with an exemplary embodiment of the present disclosure.

Inlet and outlet conduits 210, 220 may have a shape that is complementary to a shape of the shafts 232, e.g., in a plane that is perpendicular to the lateral direction. For example, inlet and outlet conduits 210, 220 and/or shafts 242 may each have a circular shape, e.g., in a plane that is perpendicular to the lateral direction. Inlet and outlet conduits 210, 220 may be supported within shafts 232 such that inlet and outlet conduits 210, 220 do not contact valve bodies 230. For example, a plurality of seals 234 may extend between inlet conduits 210 and valve bodies 230 and/or may extend between outlet conduits 220 and valve bodies 230 within shafts 232. For example, as shown in FIG. 3, each shaft 232 may have four seals 234 disposed therein. Seals 234 may be O-rings, e.g., mounted to valve bodies 230 and extending radially into shafts 232. Inlet and outlet conduits 210, 220 may slide on seals 234 within shafts 232. Valve bodies 230 each also define a pump inlet passage 236 and a pump outlet passage 238. Seals 232 may assist with separating and/or be positioned between pump inlet passage 236 and pump outlet passage 238 at shafts 232. Thus, seals 232 may limit leakage of working fluid between pump inlet passage 236 and pump outlet passage 238 in shafts 232. Seals 232 may be spaced apart from each other, e.g., along the lateral direction L, within each shaft 232.

A line 44 may extend between cold side heat exchanger 32 and pump inlet passage 236 such that working fluid from heat exchanger 32 flows through line 44 to pump inlet passage 236. A line 46 may extend between pump outlet passage 238 and cold side heat exchanger 32 such that working fluid from pump outlet passage 238 flows through line 46 to heat exchanger 32. A line 50 may extend between hot side heat exchanger 34 and pump inlet passage 236 such that working fluid from heat exchanger 34 flows through line 50 to pump inlet passage 236. A line 48 may extend between pump outlet passage 238 and hot side heat exchanger 34 such that working fluid from pump outlet passage 238 flows through line 48 to heat exchanger 34.

When a regenerator housing 140 (and associated stages 130, 132) is in the first position as shown in FIG. 9, a first stage 130 may be within the magnetic field and a second stage 132 may be out of the magnetic field. Accordingly, working fluid in first stage 130 may be heated (or cooled) due to the magneto-caloric effect, while working fluid in second stage 132 may be cooled (or heated) due to the lack of magneto-caloric effect. When a regenerator housing 140 (and associated stages 130, 132) is in the second position as shown in FIG. 10, second stage 132 may be within the magnetic field and first stage 130 may be out of the magnetic field. Accordingly, working fluid in second stage 132 may be heated (or cooled) due to the magneto-caloric effect, while working fluid in first stage 130 may be cooled (or heated) due to the lack of magneto-caloric effect. Additionally, when a stage 130, 132 is in the first position or second position, working fluid may be actively flowed to heat exchangers 32, 34, such as through inlets and outlets of the various stages 130, 132. Working fluid may be generally constant or static within stages 130, 132 during the first and second transitions.

A pump 170 is operable to facilitate such active flow of working fluid when the stages are in the first position or second position in combination with valve assembly 200. In exemplary embodiments, pump 170 may include an impeller which is rotatable with an electric motor. Construction of electric pumps with impellers and motors is understood by those skilled in the art and will not be described in greater detail herein. During operation of the heat pump 100, the motor may continuously rotate the impeller to flow working fluid through heat pump 100. Thus, e.g., pump 170 may operate constantly to flow working fluid through heat pump 100 during operation of heat pump 100, as discussed in greater detail below.

Heat pump 100 may be plumbed such that pump 170 operates with valve assembly 200 to flow working fluid through stages 130, 132 when the stages 130, 132 are in the first position (such that stage 130 is within the magnetic field M and stage 132 is out of the magnetic field M) or in the second position (such that stage 132 is within the magnetic field M and stage 130 is out of the magnetic field M). Operation of pump 170 may cause active flow of working fluid through the stages 130, 132, heat exchangers 32, 34, and system 52 generally. Pump 170 may be in fluid communication with the stages 130, 132 and heat exchangers 32, 34, such as on various lines between stages 130, 132 and heat exchangers 32, 34. In exemplary embodiments as shown, the pump 170 may be on "hot side" lines between the stages 130, 132 and heat exchanger 34 (i.e. on lines 48). Alternatively, the pumps 170 may be on "cold side" lines between the stages 130, 132 and heat exchanger 32 (i.e. on lines 44).

Working fluid may be flowable from a stage 130, 132 through hot side outlet 168 and to stage 130, 132 through cold side inlet 162 when the stage is within the magnetic field M. Working fluid may be flowable from a stage 130, 132 through cold side outlet 164 and to the stage through hot side inlet 166 during movement of stage 130, 132 when the stage is out of the magnetic field M. Accordingly, and referring now to FIG. 3, a first flow path 180 (shown with solid arrows) and a second flow path 182 (shown with dashed arrows) may be defined within heat pump 100. Each flow path 180, 182 may include flow through a first stage 130 and second stage 132, as well as flow through cold side heat exchanger 32 and hot side heat exchanger 34. The flow of working fluid may occur either along the first flow path 180 or the second flow path 182, depending on the positioning of the first and second stages 130, 132.

Valve assembly 200 directs working fluid through associated stages 130, 132 along either the first flow path 180 or the second flow path 182. For example, each of inlet conduits 210 has an opening 212, and each of outlet conduits 220 also has an opening 222. Depending upon the position of regenerator housing 140, openings 212 of inlet conduits 210 are in fluid communication with either pump inlet passage 236 or pump outlet passage 238. Similarly, openings 222 of outlet conduits 220 are in fluid communication with either pump inlet passage 236 or pump outlet passage 238 depending upon the position of regenerator housing 140 depending upon the position of regenerator housing 140. The positions of pump inlet passage 236 and pump outlet passage 238 within valve bodies 230 may be selected such that either the first flow path 180 or the second flow path 182 is formed within heat pump 200 depending upon the position of regenerator housing 140. Openings 212 of inlet conduits 210 and openings 222 of outlet conduits 220 may be positioned at a common distance from regenerator housing 140, e.g., along the lateral direction L, in certain exemplary embodiments.

FIG. 3 illustrates the first flow path 180, which may be utilized during the first position, with solid arrows. As may be seen in FIG. 3, in the first position, first stage 130 is within the magnetic field M, and second stage 132 is out of the magnetic field M. Operation of pump 170 may facilitate active working fluid flow through first flow path 180. As shown, working fluid may flow from cold side heat exchanger 32 through line 44 to pump inlet passage 236 of line 44. The working fluid in pump inlet passage 236 of line 44 may flow to cold side inlet 162 of first stage 130 and then to the first stage 130 via inlet conduit 210. From first stage 130, the working fluid at hot side outlet 168 may flow to pump outlet passage 238 of line 48 via outlet conduit 220 then to line 48 of first stage 130 and hot side heat exchanger 34. From hot side heat exchanger 34, the working fluid may flow through line 50 to pump inlet passage 236 of line 50. The working fluid in pump inlet passage 236 of line 50 may flow to hot side inlet 166 of second stage 132 and then to the second stage 132 via inlet conduit 210. From second stage 132, the working fluid at cold side outlet 164 may flow to pump outlet passage 238 of line 46 via outlet conduit 220 then to line 46 of second stage 132 and cold side heat exchanger 32.

FIG. 3 also illustrates the second flow path 182, which may be utilized during the second position, with dashed arrows. It will be understood that regenerator housing 140 is displaced from the first position shown in FIG. 3 along the lateral direction L to the second position to provide the second flow path 182. In the second position, second stage 132 is within the magnetic field M, and first stage 130 is out of the magnetic field M. Operation of pump 170 may facilitate active working fluid flow through second flow path 182. As shown, working fluid may flow from cold side heat exchanger 32 through line 44 to pump inlet passage 236 of line 44. The working fluid in pump inlet passage 236 of line 44 may flow to cold side inlet 162 of second stage 132 and then to the second stage 132 via inlet conduit 210. From second stage 132, the working fluid at hot side outlet 168 may flow to pump outlet passage 238 of line 48 via outlet conduit 220 then to line 48 of second stage 132 and hot side heat exchanger 34. From hot side heat exchanger 34, the working fluid may flow through line 50 to pump inlet passage 236 of line 50. The working fluid in pump inlet passage 236 of line 50 may flow to hot side inlet 166 of first stage 130 and then to the first stage 130 via inlet conduit 210. From first stage 130, the working fluid at cold side outlet 164 may flow to pump outlet passage 238 of line 46 via outlet conduit 220 then to line 46 of second stage 132 and cold side heat exchanger 32.

As may be seen in FIG. 3, cold side heat exchanger 32 and hot side heat exchanger 34 may be spaced apart along the transverse direction T. In particular, heat exchangers 32, 34 may be positioned opposite each other about regenerator housing 140, e.g., along the transverse direction T. Valve body assembly 230 includes a first valve body 240 and a second valve body 242. First and second valve bodies 240, 242 may be spaced apart from each other, e.g., along the transverse direction T. For example, first valve body 240 may be positioned proximate cold side heat exchanger 32, and second valve body 242 may be positioned proximate hot side heat exchanger 34. Insulation 250 may be disposed between first and second valve bodies 240, 242, e.g., along the transverse direction T. Insulation may assist with limiting heat transfer between heat exchangers 32, 34.

Each of valve bodies 230 may also have a bypass passage 260. Bypass passage 260 may be positioned or disposed between pump inlet passage 236 and pump outlet passage 238, e.g., at shaft 232, within valve bodies 230. Working fluid from pump 170 may flow through bypass passage 260 within valve bodies 230 when regenerator housing is positioned between the first and second positions, i.e., between the positions shown in FIGS. 9 and 10. Bypass passage 260 may allow pump 170 to operate continuously, e.g., without over pressurizing working fluid and thereby negatively affecting operation of pump 170. Thus, e.g., during the first and second transitions, working fluid may flow through bypass passage 260 without flowing through stages 130, 132. Bypass passage 260 may extend between and/or be contiguous with both pump inlet passage 236 and pump outlet passage 238 within valve bodies 230 during the first and second transitions.

Figure 8:
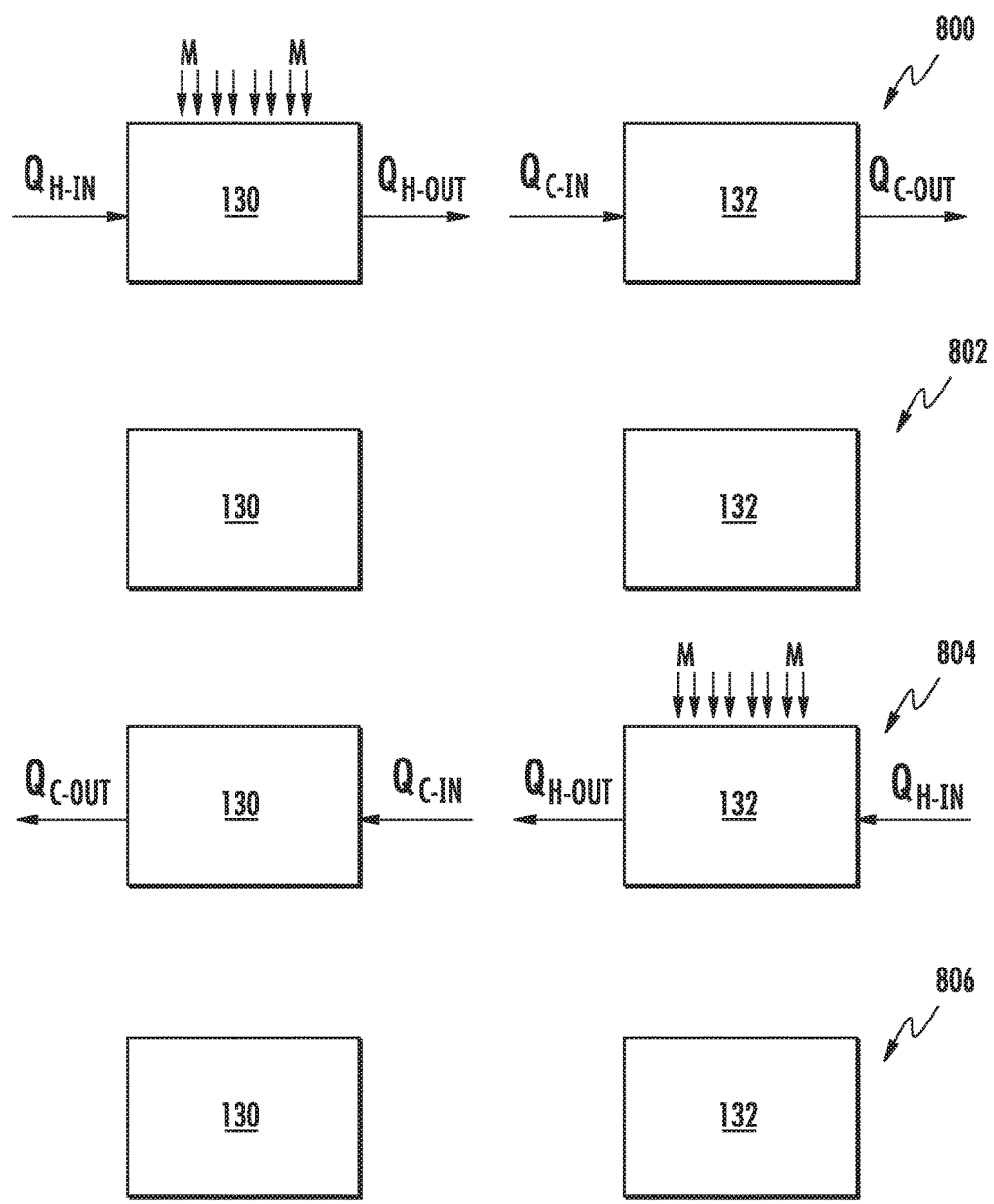
FIG. 8 is a schematic diagram illustrating various positions and movements there-between of MCM stages in accordance with an exemplary embodiment of the present disclosure.

FIG. 8 illustrates an exemplary method of the present disclosure using a schematic representation of associated stages 130, 132 of MCM during dwelling in and movement between the various positions as discussed herein. With regard to first stage 130, during step 800, which corresponds to the first position, stage 130 is fully within magnetic field M, which causes the magnetic moments of the material to orient and the MCM to heat as part of the magneto caloric effect. Further, pump 170 operates to actively flow working fluid in first flow path 180. As indicated by arrow $Q_{H\text{-}OUT}$, working fluid in stage 130, now heated by the MCM, can travel out of stage 130 and along line 48 to second heat exchanger 34. At the same time, and as indicated by arrow $Q_{H\text{-}IN}$, working fluid from first heat exchanger 32 flows into stage 130 from line 44. Because working fluid from first heat exchanger 32 is relatively cooler than the MCM in stage 130, the MCM will lose heat to the working fluid.

In step 802, stage 130 is moved from the first position to the second position in the first transition. During the time in the first transition, working fluid dwells in the MCM of stage 130. More specifically, the working fluid does not actively flow through stage 130.

In step 804, stage 130 is in the second position and thus out of magnetic field M. The absence or lessening of the magnetic field is such that the magnetic moments of the material become disordered and the MCM absorbs heat as part of the magnetocaloric effect. Further, pump 170 operates to actively flow working fluid in the second flow path 182. As indicated by arrow $Q_{C\text{-}OUT}$, working fluid in stage 130, now cooled by the MCM, can travel out of stage 130 and along line 46 to first heat exchanger 32. At the same time, and as indicated by arrow $Q_{C\text{-}IN}$, working fluid from second heat exchanger 34 flows into stage 112 from line 50 when stage 130 is in the second transition. Because working fluid from second heat exchanger 34 is relatively warmer than the MCM in stage 130, the MCM will lose some of its heat to the working fluid. The working fluid now travels along line 46 to first heat exchanger 32 to receive heat and cool refrigeration compartment 30.

In step 806, stage 130 is moved from the second position to the first position in the second transition. During the time in the second transition, the working fluid dwells in the MCM of stage 130. More specifically, the working fluid does not actively flow through stage 130.

With regard to second stage 132, during step 800, which corresponds to the first position, second stage 132 is out of magnetic field M. The absence or lessening of the magnetic field is such that the magnetic moments of the material become disordered and the MCM absorbs heat as part of the magneto-caloric effect. Further, pump 170 operates to actively flow working fluid in first flow path 180. As indicated by arrow $Q_{C\text{-}OUT}$, working fluid in stage 132, now cooled by the MCM, can travel out of stage 132 and along line 46 to first heat exchanger 32. At the same time, and as indicated by arrow $Q_{C\text{-}IN}$, working fluid from second heat exchanger 34 flows into stage 112 from line 50 when stage 132 is in the second transition. Because working fluid from second heat exchanger 34 is relatively warmer than the MCM in stage 132, the MCM will lose some of its heat to the working fluid. The working fluid now travels along line 46 to first heat exchanger 32 to receive heat and cool the refrigeration compartment 30.

In step 802, stage 132 is moved from the first position to the second position in the first transition. During the time in the first transition, the working fluid dwells in the MCM of stage 132. More specifically, the working fluid does not actively flow through stage 132.

In step 804, stage 132 is in the second position and thus fully within magnetic field M, which causes the magnetic moments of the material to orient and the MCM to heat as part of the magneto caloric effect. Further, pump 170 operates to actively flow working fluid in the second flow path 182. As indicated by arrow $Q_{H\text{-}OUT}$, working fluid in stage 132, now heated by the MCM, can travel out of stage 132 and along line 48 to second heat exchanger 34. At the same time, and as indicated by arrow $Q_{H\text{-}IN}$, working fluid from first heat exchanger 32 flows into stage 132 from line 44. Because working fluid from first heat exchanger 32 is relatively cooler than the MCM in stage 132, the MCM will lose heat to the working fluid.

In step 806, stage 132 is moved from the second position to the first position in the second transition. During the time in the second transition, working fluid dwells in the MCM of stage 132. More specifically, the working fluid does not actively flow through stage 132.

Figure 11:
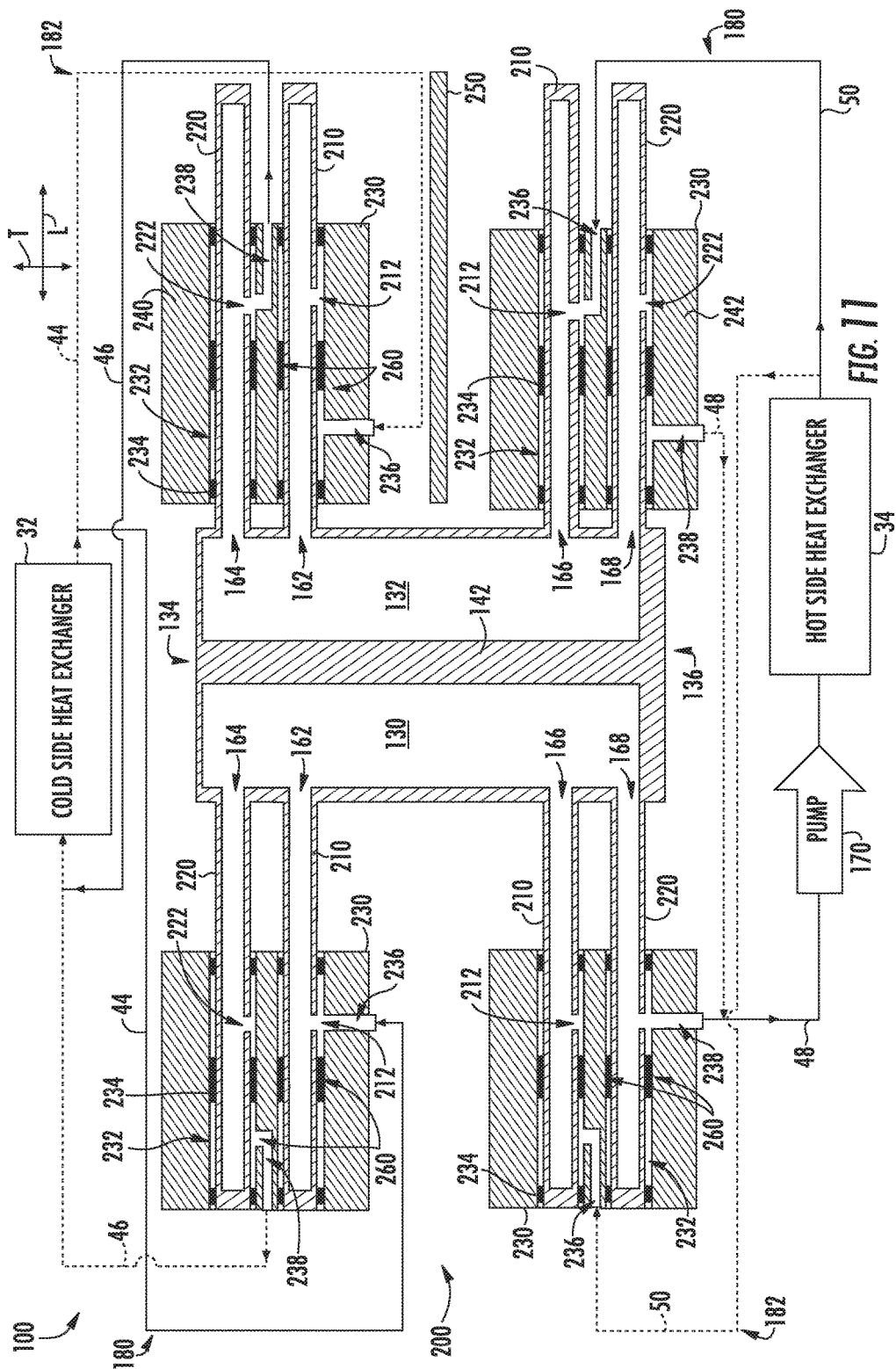
FIG. 11 is a schematic illustration of certain components of a heat pump system in accordance with another exemplary embodiment of the present disclosure.

FIG. 11 is a schematic illustration of certain components of a heat pump system in accordance with another exemplary embodiment of the present disclosure. The heat pump system 100 of FIG. 11 is constructed and operates in a similar manner to the heat pump system 100 of FIG. 3, and common components are labeled with common reference numbers. As may be seen in FIG. 11, the heat pump system 100 of FIG. 11 does not include the bypass passage 260 of the heat pump system 100 of FIG. 3. To facilitate operation of pump 170 and flow of working fluid through the heat pump system 100 of FIG. 11, operation of pump 170 may be timed or synchronized such that working fluid is not blocked by seals 234. For example, pump 170 may be a cam driven pump such that the working fluid does not flow unless flow paths through regenerator housing 140 are open. Without bypass passage 260, the heat pump system 100 of FIG. 11 may have less seals 234 than the heat pump system 100 of FIG. 3. For example, each shaft 232 may have three seals 234 disposed therein in the heat pump system 100 of FIG. 11. In such a manner, viscous heat generation may be reduced in heat sensitive areas of the fluid flow circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump, comprising:
   a magnet generating a magnetic field;
   a regenerator housing comprising a body and a stage, the body defining a chamber, the stage comprising a magneto-caloric material disposed within the chamber, the regenerator housing movable along a lateral direction between a first position and a second position relative to the magnet, the stage positioned within the magnetic field of the magnet when the regenerator housing is in the first position, the stage positioned remote from the magnetic field of the magnet when the regenerator housing is in the second position;

a pump operable to flow working fluid through the chamber of the regenerator housing;

a valve assembly for regulating a flow of the working fluid from the pump through the chamber of the regenerator housing, the valve assembly comprising a pair of inlet conduits extending along the lateral direction from the regenerator housing, the inlet conduits of the pair of inlet conduits spaced apart from each other on the regenerator housing along a transverse direction that is perpendicular to the lateral direction;

a pair of outlet conduits extending along the lateral direction from the regenerator housing, the outlet conduits of the pair of outlet conduits spaced apart from each other on the regenerator housing along the transverse direction;

a valve body assembly defining a plurality of shafts, each shaft of the plurality of shafts receiving a respective conduit of the pair of inlet conduits and the pair of outlet conduits, the conduits of the pair of inlet conduits and the pair of outlet conduits slidable within the shafts of the plurality of shafts when the regenerator housing moves between the first and second positions.

2. The heat pump of claim 1, wherein the conduits of the pair of inlet conduits and the pair of outlet conduits are parallel to one another.

3. The heat pump of claim 1, further comprising a cold side heat exchanger and a hot side heat exchanger, the cold side and hot side heat exchangers positioned opposite each other about the regenerator housing along the transverse direction, the pump operable to flow the working fluid between the cold side and hot side heat exchangers through the chamber of the regenerator housing.

4. The heat pump of claim 1, wherein the valve body assembly further comprises a first valve body and a second valve body, the first valve body positioned proximate the cold side heat exchanger and the second valve body positioned proximate the hot side heat exchanger.

5. The heat pump of claim 4, wherein the valve body assembly further comprises insulation disposed between the first and second valve bodies along the transverse direction.

6. The heat pump of claim 4, wherein a first inlet conduit of the pair of inlet conduits and a first outlet conduit of the pair of outlet conduits are received within the first valve body, the first valve body defining an inlet passage and an outlet passage, the inlet passage of the first valve body being in fluid communication with the chamber of the regenerator housing via the first inlet conduit of the pair of inlet conduits when the regenerator housing is in the first position, the inlet passage of the first valve body being out of fluid communication with the chamber of the regenerator housing when the regenerator housing is in the second position, the outlet passage of the first valve body being out of fluid communication with the chamber of the regenerator housing when the regenerator housing is in the first position, the outlet passage of the first valve body being in fluid communication with the chamber of the regenerator housing via the first outlet conduit of the pair of outlet conduits when the regenerator housing is in the second position.

7. The heat pump of claim 6, wherein a second inlet conduit of the pair of inlet conduits and a second outlet conduit of the pair of outlet conduits are received within the second valve body, the second valve body defining an inlet passage and an outlet passage, the inlet passage of the second valve body being out of fluid communication with the chamber of the regenerator housing when the regenerator housing is in the first position, the inlet passage of the second valve body being in fluid communication with the chamber of the regenerator housing via the second inlet conduit of the pair of inlet conduits when the regenerator housing is in the second position, the outlet passage of the second valve body being in fluid communication with the chamber of the regenerator housing via the second outlet conduit of the pair of outlet conduits when the regenerator housing is in the first position, the outlet passage of the second valve body being out of fluid communication with the chamber of the regenerator housing when the regenerator housing is in the second position.

8. The heat pump of claim 7, wherein the first valve body defines a bypass passage between the inlet and outlet passages of the first valve body, the second valve body defining a bypass passage between the inlet and outlet passages of the second valve body.

9. The heat pump of claim 1, wherein the valve body assembly further comprises a plurality of radial seals, seals of the plurality of radial seals disposed within each shaft of the plurality of shafts such that the seals of the plurality of radial seals are spaced apart from each other along the lateral direction within each shaft of the plurality of shafts.

10. The heat pump of claim 1, wherein the pump is an electric pump comprising a motor and an impeller.

11. A heat pump, comprising:

a magnet generating a magnetic field;

a regenerator housing comprising a body and a pair of stages, the body defining a pair of chambers spaced apart from each other along a lateral direction within the body, each stage of the pair of stages comprising a magneto-caloric material disposed within a respective chamber of the pair of chambers, the regenerator housing movable along the lateral direction between a first position and a second position relative to the magnet, a first stage of the pair of stages positioned within the magnetic field of the magnet and a second stage of the pair of stages positioned remote from the magnetic field of the magnet when the regenerator housing is in the first position, the first stage positioned remote from the magnetic field of the magnet and the second stage positioned within the magnetic field of the magnet when the regenerator housing is in the second position;

a pump operable to flow working fluid;

a valve assembly for regulating a flow of the working fluid from the pump through the pair of stages, the valve assembly comprising four valve bodies, each valve body of the four valve bodies defining a pair of shafts;

four inlet conduits extending along the lateral direction from the regenerator housing, a respective inlet conduit of the four inlet conduits received and slidable within a first shaft of each valve body of the four valve bodies;

four outlet conduits extending along the lateral direction from the regenerator housing, a respective outlet conduit of the four outlet conduits received and slidable within a second shaft of each valve body of the four valve bodies.

12. The heat pump of claim 11, wherein the conduits of the four inlet conduits and the four outlet conduits extend parallel to one another.

13. The heat pump of claim 11, further comprising a cold side heat exchanger and a hot side heat exchanger, the cold side and hot side heat exchangers positioned opposite each other about the regenerator housing along a transverse direction that is perpendicular to the lateral direction, the pump operable to flow the working fluid between the cold side and hot side heat exchangers through the regenerator housing.

14. The heat pump of claim 11, wherein a first pair of the four valve bodies are positioned proximate the cold side heat exchanger and a second pair of the four valve bodies are positioned proximate the hot side heat exchanger.

15. The heat pump of claim 14, wherein the valve body assembly further comprises insulation disposed between first pair of the four valve bodies along a transverse direction that is perpendicular to the lateral direction.

16. The heat pump of claim 14, wherein:
   each valve body of the four valve bodies defines an inlet passage and an outlet passage;
   a first inlet conduit of four inlet conduits and a first outlet conduit of the four outlet conduits are received within a first valve body of the four valve bodies, a second inlet conduit of four inlet conduits and a second outlet conduit of the four outlet conduits are received within a second valve body of the four valve bodies, a third inlet conduit of four inlet conduits and a third outlet conduit of the four outlet conduits are received within a third valve body of the four valve bodies, a fourth inlet conduit of four inlet conduits and a fourth outlet conduit of the four outlet conduits are received within a fourth valve body of the four valve bodies;
   when the regenerator housing is in the first position, the inlet passage of the first valve body is in fluid communication with a first chamber of the pair of chambers via the first inlet conduit of four inlet conduits, the outlet passage of the second valve body is in fluid communication with the first chamber of the pair of chambers via the second outlet conduit of four outlet conduits, the inlet passage of the third valve body is in fluid communication with a second chamber of the pair of chambers via the third inlet conduit of four inlet conduits, and the outlet passage of the fourth valve body is in fluid communication with the second chamber of the pair of chambers via the fourth outlet conduit of four outlet conduits; and
   when the regenerator housing is in the second position, the outlet passage of the first valve body is in fluid communication with the first chamber of the pair of chambers via the first outlet conduit of four outlet conduits, the inlet passage of the second valve body is in fluid communication with the first chamber of the pair of chambers via the second inlet conduit of four inlet conduits, the outlet passage of the third valve body is in fluid communication with the second chamber of the pair of chambers via the third outlet conduit of four outlet conduits, and the inlet passage of the fourth valve body is in fluid communication with the second chamber of the pair of chambers via the fourth inlet conduit of four inlet conduits.

17. The heat pump of claim 16, wherein each valve body of the four valve bodies defines a bypass passage between the inlet and outlet passages of the four valve bodies.

18. The heat pump of claim 11, wherein the valve body assembly further comprises a plurality of radial seals, seals of the plurality of radial seals disposed within each shaft of the pair of shafts of the four valve bodies such that the seals of the plurality of radial seals are spaced apart from each other along the lateral direction within each shaft of the pair of shafts.

19. The heat pump of claim 11, wherein the pump is an electric pump comprising a motor and an impeller.

* * * * *